(12) United States Patent
Nagasawa

(10) Patent No.: US 10,864,878 B2
(45) Date of Patent: Dec. 15, 2020

(54) PASSENGER PROTECTION APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 78 days.

(21) Appl. No.: 16/239,890

(22) Filed: Jan. 4, 2019

(65) Prior Publication Data

US 2019/0299904 A1  Oct. 3, 2019

(30) Foreign Application Priority Data

Mar. 30, 2018 (JP) ................. 2018-068593

(51) Int. Cl.
  *B60R 21/207* (2006.01)
  *B60R 21/2338* (2011.01)
  (Continued)

(52) U.S. Cl.
  CPC ........ *B60R 21/207* (2013.01); *B60R 21/0132* (2013.01); *B60R 21/2338* (2013.01); *B60R 2021/0044* (2013.01); *B60R 2021/01211* (2013.01); *B60R 2021/161* (2013.01); *B60R 2021/23386* (2013.01)

(58) Field of Classification Search
  CPC .............. B60R 21/207; B60R 21/2338; B60R 21/0132; B60R 2021/161; B60R 2021/01211; B60R 2021/23386; B60R 2021/0044; B60R 2021/23146;
  (Continued)

(56) References Cited

U.S. PATENT DOCUMENTS 5,575,497 A   11/1996  Suyama et al.
6,250,677 B1 *  6/2001  Fujimura ............ B60R 21/233
                                       280/730.1
(Continued)

FOREIGN PATENT DOCUMENTS

DE  10 2015 001198 A1  8/2016
JP  H07-329688 A       12/1995
(Continued)

OTHER PUBLICATIONS

Japanese Office Action dated Aug. 27, 2019 for Japanese Patent Application No. 2018-068593 (5 pages in Japanese with English Translation).

(Continued)

*Primary Examiner* — Darlene P Condra
(74) *Attorney, Agent, or Firm* — Smith, Gambrell & Russell, LLP

(57) ABSTRACT

A passenger protection apparatus for vehicle includes an airbag and a regulating member. The airbag is capable of deploying forward or upward from a side of a seat on which a passenger sits. The regulating member is capable of regulating deployment of the airbag. The regulating member connects a side of a seat back to a side of a lower part of the seat, and is configured to contact an outside of the airbag in a seat width direction to regulate a deployment direction of the airbag to deploy the airbag inward in the seat width direction.

20 Claims, 5 Drawing Sheets

(51) Int. Cl.
  *B60R 21/0132* (2006.01)
  *B60R 21/16* (2006.01)
  *B60R 21/01* (2006.01)
  *B60R 21/00* (2006.01)

(58) Field of Classification Search
  CPC .......... B60R 21/23138; B60R 21/0134; B60R 21/0136; B60R 21/2334
  See application file for complete search history.

(56) References Cited

U.S. PATENT DOCUMENTS

| | | | |
|---|---|---|---|
| 9,994,181 B1* | 6/2018 | Dubaisi | B60R 21/23138 |
| 2005/0236819 A1* | 10/2005 | Riedel | B60R 21/207 |
| | | | 280/730.2 |
| 2006/0119083 A1* | 6/2006 | Peng | B60R 21/207 |
| | | | 280/730.2 |
| 2006/0131847 A1* | 6/2006 | Sato | B60R 21/23138 |
| | | | 280/730.2 |
| 2007/0024033 A1* | 2/2007 | Suzuki | B60R 21/2338 |
| | | | 280/730.2 |
| 2008/0231026 A1* | 9/2008 | Naito | B60R 21/2338 |
| | | | 280/730.2 |
| 2010/0109306 A1* | 5/2010 | Dong | B60R 21/2338 |
| | | | 280/743.2 |
| 2014/0015233 A1* | 1/2014 | Fukawatase | B60R 21/08 |
| | | | 280/730.1 |
| 2014/0062069 A1* | 3/2014 | Fukawatase | B60R 21/207 |
| | | | 280/730.2 |
| 2014/0300088 A1* | 10/2014 | Fukawatase | B60R 21/08 |
| | | | 280/729 |
| 2015/0360636 A1* | 12/2015 | Kaneko | B60R 21/217 |
| | | | 280/730.2 |
| 2018/0326938 A1* | 11/2018 | Rickenbach | B60R 21/233 |

FOREIGN PATENT DOCUMENTS

| | | |
|---|---|---|
| JP | 2006-008105 A | 1/2006 |
| JP | 2009-029182 A | 2/2009 |
| JP | 2014-012475 A | 1/2014 |

OTHER PUBLICATIONS

Japanese Office Action dated Nov. 12, 2019 for Japanese Patent Application No. 2018-068593 (3 pages in Japanese with English Translation).

* cited by examiner

PASSENGER PROTECTION APPARATUS FOR VEHICLE

The present application claims priority from Japanese Patent Application No. 2018-068593 filed on Mar. 30, 2018, the entire contents of which are hereby incorporated by reference.

TECHNICAL FIELD

The present invention relates to a passenger protection apparatus for vehicle.

RELATED ART

In order to protect a passenger in a vehicle, an airbag provided in a seat near the passenger has been used. There has been known a side airbag device capable of protecting the head of a passenger including an airbag body deployed between a body side part of the vehicle and a part from the chest to the head of the passenger, and an airbag projecting member deployed to project in front of the face of the passenger from the airbag body, which is disclosed, for example, in in Japanese Unexamined Patent Application Publication No. 2006-008105.

SUMMARY OF THE INVENTION

An aspect of the present invention provides a passenger protection apparatus for vehicle. The apparatus includes: an airbag capable of deploying forward or upward from a side of a seat on which a passenger sits; and a regulating member capable of regulating deployment of the airbag. The regulating member connects a side of a seat back to a side of a lower part of the seat, and is configured to contact an outside of the airbag in a seat width direction to regulate a deployment direction of the airbag to deploy the airbag inward in the seat width direction.

DETAILED DESCRIPTION

Figure 1A:
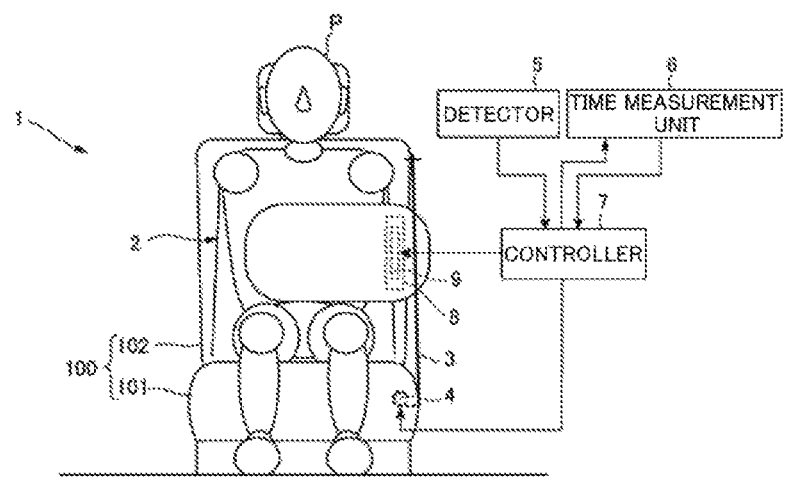
FIG. 1A is a front view schematically illustrating a passenger protection apparatus according to an example of the present invention.

Hereinafter, an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description. As automated driving technology has been developing, the sitting position and posture of the passenger in the vehicle compartment will increasingly become free. In that case, the seat layout may be different from the past, and therefore it may be difficult to protect the passenger by the conventional airbag provided in a steering or an instrument panel. Accordingly, there is an increasing demand to provide a passenger protection device such as an airbag disposed in the seat. However, it is difficult for the above-described conventional side airbag device to cope with collisions in all directions.

Figure 1B:
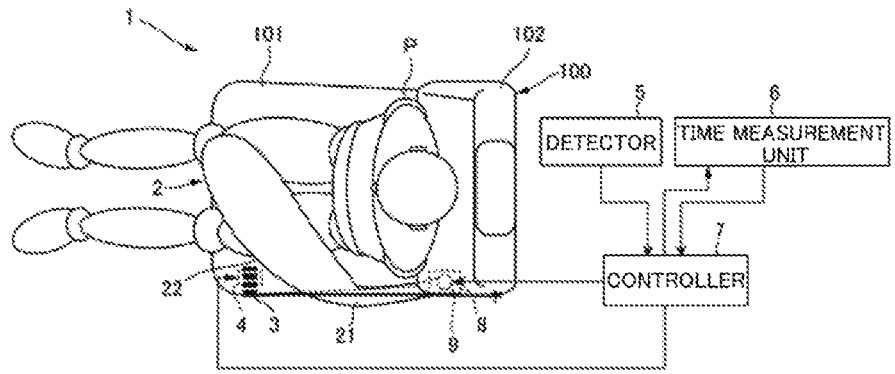
FIG. 1B is a plan view schematically illustrating the passenger protection apparatus.
Figure 2:
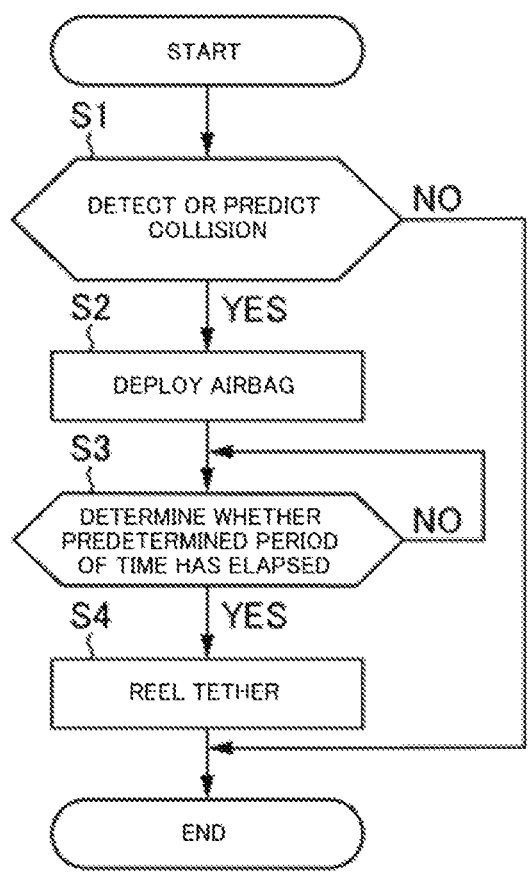
FIG. 2 is a flowchart illustrating a control process to deploy an airbag illustrated in FIGS. 1A-1B.

It is desirable to provide a passenger protection apparatus for vehicle capable of protecting a passenger from various types of collisions only by components of the seat on which the passenger sits. FIG. 1A is a front view schematically illustrating a passenger protection apparatus 1 according to an example of the present invention. FIG. 1B is a plan view schematically illustrating the passenger protection apparatus 1. FIG. 2 is a flow chart illustrating a control process to deploy an airbag 2 illustrated in FIG. 2. FIGS. 3A-3B and FIGS. 4A-4B illustrate the deployment of the airbag 2 of the passenger protection apparatus 1.

As illustrated in FIGS. 1A-1B, the passenger protection apparatus 1 includes the airbag 2, and a tether 3. In addition, the passenger protection apparatus 1 includes a reeler 4, a detector 5, a time measurement unit 6, and a controller 7 to activate the airbag 2 and adjust the length of the tether 3.

The airbag 2 is deployed via the surface of a seat 100 on which a passenger P sits. As illustrated in FIG. 1B, the airbag includes a base portion 21 extending forward from the seat back 102 along the side of the passenger P, and a front portion 22 extending from the base portion 21 along the width direction of the seat 100 (hereinafter "seat width direction), and located in front of the passenger P. The seat 100 includes a seat cushion 101 on which the passenger P can sit, and a seat back 102 on which the passenger P can lean back. The airbag 2 is made of fabric and has a pouch-shaped body. Before the deployment, the airbag 2 is folded and stored in a storage member 8 disposed in the seat back 102. The airbag 2 is formed in a plate-like shape. In order to deploy the airbag 2, gas generated in an inflator 9 provided in the storage member 8 is injected into the airbag 2. Then, the airbag 2 expands and protrudes from the storage member 8 to tear the surface of the seat back 102, and therefore to deploy in the vehicle compartment. Here, with the present example, the airbag 2 protrudes from the surface of the seat 100. However, this is by no means limiting, and the airbag 2 may protrude from an interior material as a peripheral member of the seat 100.

The tether 3 is a long member made of, for example, the same material as that of the airbag 2. The tether 3 is configured to connect the side of the seat back 102 to the side of the lower part of the seat 100. To be more specific, the first end of the tether 3 is coupled to the side of the upper portion of the seat back 102, and the second end of the tether 3 is coupled to the reeler 4 disposed in the side of the front portion of the seat cushion 101 which constitutes a lower part of the seat 100. In one example, the tether 3 may server a "regulating member".

The reeler 4 is disposed in the seat cushion 101 and configured to adjust the length of the tether 3. The reeler 4 is configured to hold the second end of the tether 3 and rotationally driven by gas or electricity. The reeler 4 rotates about the rotation axis to reel the tether 3. Here, the reeler 4 may rotate in the direction opposite to the direction in which the tether 3 is reeled to unreel the tether 3. In one example, the reeler 4 may serve an "adjuster". With the present example, the deployment of the airbag 2 is regulated by the arrangement of the tether 3 and the reel-up of the tether 3 by the reeler 4.

The detector 5 detects or predicts a collision of the vehicle. To be more specific, the detector 5 detects or predicts a collision of the own vehicle with another vehicle or an obstacle, based on the monitoring result of the surrounding environment of the vehicle by a camera or a sensor. The first detector 5 can output the detection result to the controller 7. The detector 5 can determine an occurrence of a collision based on the detection of an impact on the own vehicle by, for example, an in-vehicle acceleration sensor. As for the prediction of a collision, it is possible to derive a possibility that another vehicle or an obstacle contacts the own vehicle by combining the result of monitoring another vehicle or an obstacle by an monitoring camera or sensor in the vehicle that monitors the outside of the vehicle with parameters such as the running speed and the direction of the vehicle. Moreover, it is possible to determine whether there is a high or low possibility of a collision based on whether the derived result exceeds a predetermined threshold. The detector 5 may be realized by a combination of a processing unit to analyze the monitoring results and, for example, an in-vehicle camera, a monitoring sensor, or an acceleration sensor.

The time measurement unit 6 is configured to measure an elapsed time from the start of the activation of the inflator 9. To be more specific, upon receiving an electrical signal from the controller 7, which indicates that the controller 7 outputs an activation signal to the inflator 9, the time measurement unit 6 starts to measure an elapsed time, and outputs an electrical signal indicating the result of measurement to the controller 7. The time measurement unit 6 may be realized by a combination of, for example, a timer to measure a time and an in-vehicle processing unit such as an ECU.

The controller 7 controls the activation of the inflator 9 and the reeler 4. To be more specific, the controller 5 activates the inflator 9 based on the detection result outputted from the detector 5, and activates the reeler 4 based on the measurement result outputted from the time measurement unit 6. The inflator 9 activated by the controller 5 ignites explosives to generate gas. The reeler 4 activated by the controller 7 rotates about the rotation axis. The controller 7 can output activating signals to the inflator 9 and the reeler 4. As the controller 5, for example, an ECU which is an in-vehicle processing unit may be used.

Next, the control process of the passenger protection apparatus 1 will be described with reference to FIG. 2, and the deployment of the airbag 2 will be described with reference to FIGS. 3A-3B and 4A-4B.

First, the detector 5 detects or predicts a collision of the own vehicle (step S1). In the step S1, when the detector 5 determines that a collision occurs based on the detection result, the step moves to the next step (step S1/YES). In addition, in the step S1, upon detecting another vehicle or an obstacle approaching the own vehicle, the detector 5 derives a risk due to the approach, and predicts a collision when the risk value exceeds a predetermined threshold. In this case, the step moves to the next step (step S1/YES). Here, when the detector 5 determines that there is no collision based on the detection result, there is no need to prepare a collision and activate the inflator 9 and the reeler 4, and therefore the process is ended (step S1/NO). In addition, when the detector 5 does not predict a collision because there is no vehicle or obstacle approaching the own vehicle, or when there is a low possibility of a collision because the risk value does not exceed the predetermined threshold although another vehicle or an obstacle approaches the own vehicle, the process is also ended (step S1/NO). The detection result of the detector 5 is outputted to the controller 7.

Figure 3A:
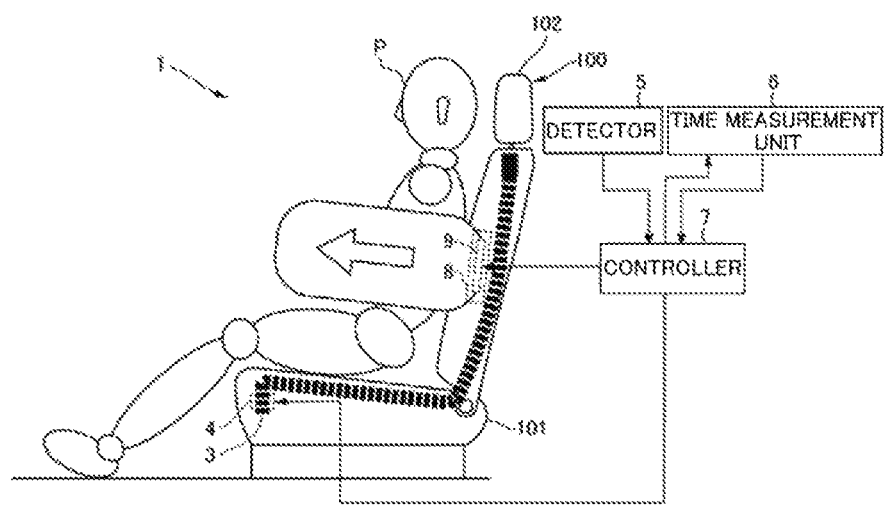
FIGS. 3A-3B illustrates the deployment of the airbag of the passenger protection apparatus illustrated in FIGS. 1A-1B.
Figure 3B:
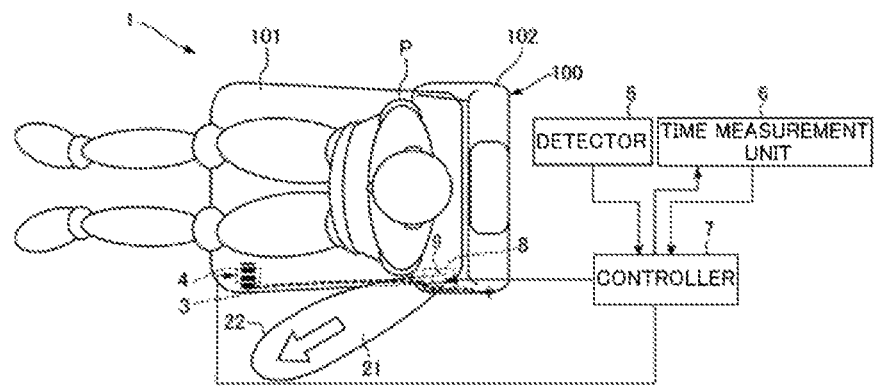

When the detector 5 detects or predicts a collision (step S1/YES), the controller 7 activates the inflator 9 (step S2). In the step S2, upon receiving an activation signal from the controller 7, the inflator 9 ignites explosives to generate gas. The gas generated in the inflator 9 is injected into the airbag 2 to expand the airbag 2, and the expanding airbag 2 tears the surface of the seat back 102 and protrudes from the seat back 102. FIGS. 3A and 3B illustrate the airbag 2 before being regulated by the tether 3. Here, the controller 7 outputs an electrical signal to the time measurement unit 6, which indicates that an activation signal has been outputted to the inflator 9. Upon receiving the signal from the controller 7, the time measurement unit 6 starts to measure an elapsed time from the start of the activation of the inflator 9.

Before the reeler 4 is activated, the tether 3 is embedded in the side of the seat 100 from the seat back 102 to the seat cushion 101 as illustrated in FIG. 3A. The side of the seat 100 in which the tether 3 is embedded is easily torn.

The airbag 2 illustrated in FIGS. 3A-3B is approximately filled with a predetermined amount of gas. At this time, the reeler 4 has not been activated, and therefore the tether 3 remains inside the side of the seat 100. As illustrated in FIGS. 3A-3B, the airbag 2 protrudes outward in the seat width direction, toward the front of the seat 100.

When the airbag 2 deploys at a degree equal to or higher than a predetermined value, the controller 7 regulates the deployment of the airbag 2. In the control process to regulate the deployment of the airbag 2 of the passenger protection apparatus 1, the time measurement unit 6 determines whether a predetermined period of time has elapsed from the start of the deployment of the airbag 2 (step S3). In the step S3, the time measurement unit 6 determines whether the elapsed time from the start of the activation of the inflator 6, that is, the start of the deployment of the airbag 2 is longer than a predetermined time threshold. When the elapsed time from the start of the deployment of the airbag 2 is longer than the predetermined time threshold, the step moves to the next step (step S3/YES). On the other hand, the elapsed time from the start of the deployment of the airbag 2 is equal to or shorter than the predetermined time threshold, the step 3 is repeatedly performed (step S3/NO). The determination result is outputted from the time measurement unit 6 to the controller 7.

Figure 4A:
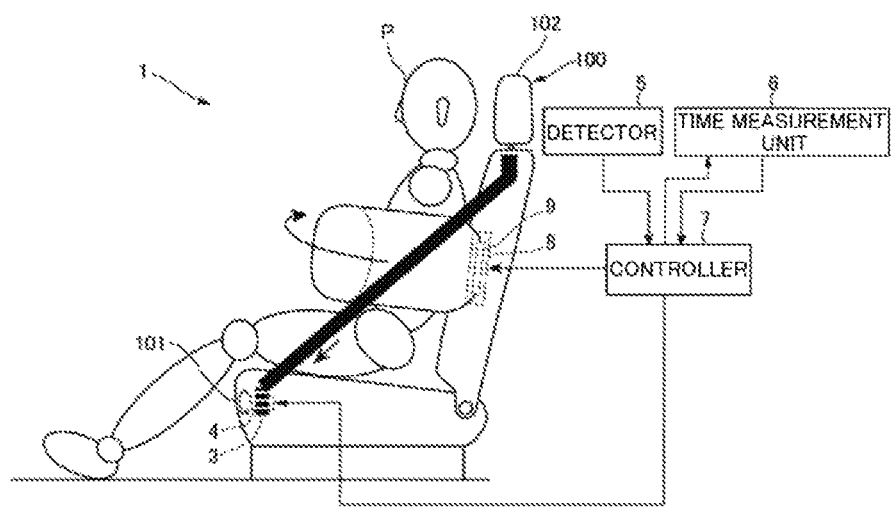
FIGS. 4A-4B illustrates the deployment of the airbag of the passenger protection apparatus illustrated in FIGS. 1A-1B.
Figure 4B:
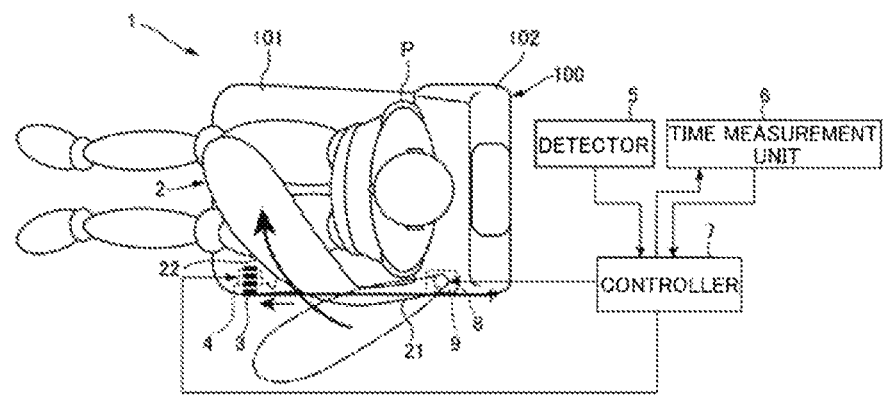

When the time measurement unit 6 determines that the elapsed time is longer than the predetermined time threshold (step S3/YES), the controller 7 activates the reeler 4 (step S4). In the step S4, the controller 7 inputs an activate signal to the reeler 4 to rotate the reeler 4 about the rotation axis. FIGS. 4A-4B illustrate the airbag 2 and the tether 3 when the reeler 4 rotates.

As the airbag 2 is expanding, the tether 3 is reeled by the reeler 4 to regulate the deployment of the airbag 2, and then the deployment of the airbag 2 is completed as illustrated in FIGS. 4A-4B. The reeler 4 reels the tether 3 embedded in the side of the seat 100, so that the tether 3 tears the seat surface, and is drawn and exposed on the side of the seat 100. Then, as the tether 3 is further reeled, the length of the tether 3 exposed outside the side of the seat 100 is reduced to minimize the distance between the side of the seat back 102 and the side of the seat cushion 101 which are connected via the tether 3. That is, the tether 3 reeled by the reeler 4 becomes a straight line between the first end coupled to the seat back 102 and the reeler 4 around which the tether 3 is wound.

The tether 3 is embedded in the seat 100 behind the position at which the airbag 2 tears the seat surface and protrudes from the seat back 102. Therefore, the tether 3 contacts the outside of the airbag 2 in the seat width direction until the completion of the deployment illustrated in FIGS. 4A-4B since the tether 3 is exposed on the side of the seat 100. At this time, the tether 3 slides on the surface of the airbag 2 forward from behind the position at which airbag 2 is exposed on the seat 100. In the state illustrated in FIGS. 4A-4B, the tensile force of the tether 3 is maximized, and the pushing force of the tether 3 to push the airbag 2 inward in the seat width direction is also maximized. The tether 3 is reeled by the rotating reeler 4 to push the airbag 2 inward in the width direction, so that the front portion 22 of the airbag 2 is turned inward in the seat width direction as illustrated in FIG. 4B. That is, the tether 3 extending along the side of the seat 100 regulates the deployment of the airbag 2, so that the base portion 21 is curved to turn the front portion 22 of the airbag inward in the seat width direction. As a result, the front portion 22 of the airbag deploys in front of the upper body of the passenger P. In FIG. 4B, the front portion 22 of the airbag is turned inward in the seat width direction, so that the airbag 2 is completely deployed.

As illustrated in FIGS. 4A-4B, the airbag 2 protrudes from the seat back 102 at a position outside the upper body of the passenger P in the seat width direction, toward the front of the seat 100, and the tether 3 contacts the outside of the airbag 2 in the seat width direction. Therefore, the front portion 22 of the airbag 2 is turned inward in the seat width direction, and therefore deploys in front of the upper body of the passenger P.

Accordingly, the airbag 2 protruding from the seat back 102 is deployed to cover the front and the side of the upper body of the passenger P. As a result, it is possible to protect the passenger P from various types of collisions such as a frontal collision, a lateral collision, a rear collision, and an oblique collision only by the components of the seat 100.

As illustrated in FIGS. 3A-3B and 4A-4B, the airbag 2 is deployed outward in the width direction, toward the front of the seat 100 but never faces the passenger P until the final stage of the deployment. It is because the time threshold of the time measurement unit 6 is set not to allow the tether 3 to push the airbag 2 inward in the seat width direction at least until the airbag 2 is sufficiently deployed forward in front of the passenger P. By this means, it is possible to prevent the airbag 2 from curving or bending to approach the passenger P by the contact of the tether 3 until the final stage of the deployment of the airbag 2, that is, until the vigorous motion of the airbag 2 in various directions nearly ends. Therefore, it is possible to reduce the risk of hitting the passenger P against the airbag 2.

Moreover, with the example illustrated in FIGS. 1A-1B to 4A-4B, the tether 3 is disposed outside the upper body of the passenger P in the seat width direction, both when the tether 3 is embedded in the seat 100 and when the tether 3 is exposed on the seat 100. By this means, it is possible to prevent the tether 3 from contacting the upper body of the passenger P. Accordingly, it is possible to prevent the tether 3 from harming the passenger P. In addition, it is possible to prevent the tether 3 from catching the upper body of the passenger P, and therefore the tether 3 can certainly contact the airbag 2 in a stable manner. As a result, it is possible to ensure that the airbag 2 is curved as illustrated in FIGS. 1A-1B and 4A-4B, and therefore to improve the passenger protection performance of the airbag 2 near the passenger P.

Instead of the tether 3, the regulating member according to the present example may be a planar member. The planar member may have a width greater than that of the tether 3. The planar member may be a sheet-like member. The upper end to the lower end of the side of the seat back 102 and the front end to the rear end of the side of the seat cushion 101 are connected via the sheet-like member. The planar member as a regulating member can effectively contact the airbag 2 to regulate the deployment of the airbag 2, and support the airbag 2 in surface contact with the side of the airbag 2 in a lateral collision. Consequently, it is possible to improve the passenger protection performance. Here, the planar member is not limited as long as the contact force is applied to the airbag 2 in a planar fashion, for example, a mesh-like member, and a grid-like tether may be applicable.

With the present example, the reeler 4 reels the tether 3 to linearly increase the tensile force of the tether 3. However, this is by no means limiting, and, for example, the tensile force of the tether 3 may be increased once, and reduced, and then, increased again. Otherwise, the tensile force of the tether 3 may be changed depending on the types of collisions.

By loosening the tether 3 once and tightening the tether 3 again, it is possible to allow the tether 3 to certainly contact a predetermined portion of the airbag 2. In this case, even though the tether 3 is reeled before the deployment of the airbag 2 to previously dispose the tether 3 on the route of the deployment of the airbag 2, the tether 3 is loosened once to prevent the tether 3 from interfering with the deployment of the airbag 2, and, when the tether 3 is tightened again, it is possible to certainly push the outside of the airbag 2 in the seat width direction.

When the tensile force of the tether 3 is increased step by step, the pushing force of the tether 3 to push the airbag 2 inward in the seat width direction is also increased step by step, and therefore the front portion 22 of the airbag 2 is gradually turned inward in the seat width direction. By this means, it is possible to deploy the airbag 2 in a stable manner.

In order to change the tensile force of the tether 3 depending on the types of collisions, the reel-up amount of the reeler 4 is adjusted depending on the type of a collision, such as a frontal collision or a lateral collision derived based on the detection result by the detector 5 to increase or decrease the tensile force of the tether 3. Alternatively, in order to change the tensile force of the tether 3, the speed at which the reeler 4 reels the tether 3 may be adjusted. When a frontal collision occurs at a high speed, the airbag 2 needs to be rapidly deployed in front of the passenger P, and therefore the speed at which the reeler 4 reels the tether 3 may be set high. When an oblique collision or a lateral collision occurs, the airbag 2 needs to be deploy obliquely or laterally with respect to the passenger P, and therefore the speed at which the reeler reels the tether 3 may not need to be set high. When a lateral collision occurs, it is preferred to support the side of the airbag 2 by the tether 3, and therefore the reel-up amount of the reeler 4 may be set large to increase the tensile force of the tether 3.

With the present example, the reeler 4 reels the tether 3 exposed outside the seat 100 to tighten the tether 3 to form into a straight line. However, this is by no means limiting, and, in order to tighten the tether 3, a movable member configured to support the second end of the tether 3 and move in the front-rear direction of the seat 100 may be used, instead of the reeler 4. The movable member may be provided in the side of the rear part of the seat cushion 101 and move forward holding the second end of the tether 3 during the deployment of the airbag 2. By this means, it is possible to tighten the tether 3 to become a straight line as illustrated in FIG. 4A.

With the present example, the tether 3 is tightened to become a straight line after the start of the deployment of the airbag 2 to regulate the direction in which the airbag 2 deploys. However, this is by no means limiting, and the airbag 2 may be deployed after the regulating member such as the tether 3 is ready to regulate the deployment of the airbag 2.

Figure 5:
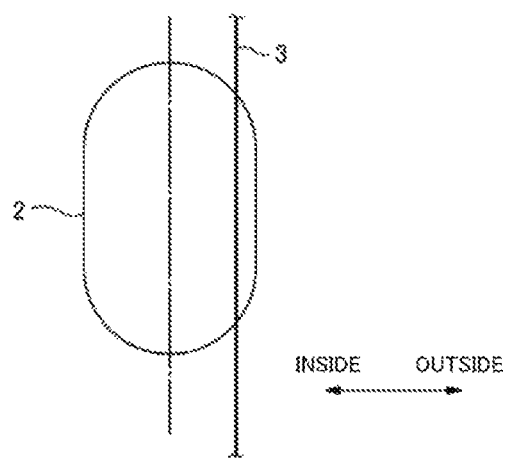
FIG. 5 schematically illustrates the positional relationship between the airbag and a regulating member in the passenger protection apparatus according to another example of the present invention.

FIG. 5 illustrates a preferred positional relationship between the regulating member and the airbag 2 in a case where the regulating member is ready to regulate the deployment of the airbag 2 before the start of the deployment of the airbag 2. That is, in the case where the tether 3 is tightened (that is, the tether 3 is ready to regulate the deployment of the airbag 2), and then the airbag 2 deploys toward the tether 3, it is preferred that the positional relationship illustrated in FIG. 5 is formed between the airbag 2 and the tether 3. To be more specific, when the airbag 2 is deployed forward from the seat back 2 under the condition where the tether 3 is ready to regulate the deployment of the airbag 2, the front end of the airbag 2 contacts the tether 3 from behind. At this time, the tether 3 contacts the area between the outer end and the center of the airbag 2 in the seat width direction. By this means, it is easily regulate the deployment direction of the airbag 2 to deploy the airbag 2 inward in the seat width direction by the tether 3.

In a case where, for example, a period of time until a collision of the vehicle is short, or in a case of a lateral collision where a period of time to protect the passenger P is short, it is preferred that the deployment of the airbag 2 is started at the same time as or after the regulating member is ready to regulate the deployment of the airbag 2. In this case, the controller 7 can output an activation signal to the regulating member and the inflator 9 to activate the inflator 9 at the same time as or immediately after the reeler 4 is activated.

In the case where the airbag 2 is deployed from the seat back 102 after the regulating member is ready to regulate the deployment of the airbag 2, the airbag 2 protrudes from the seat back 102 at a position outside the upper body of the passenger P in the seat width direction, toward the front of the seat 100, and contacts the regulating member from behind. Therefore, the front portion 22 of the airbag 2 is turned inward in the seat width direction to deploy in front of the upper body of the passenger P.

In addition, in a case where the airbag 2 is deployed from the seat cushion 101 after the regulating member is ready to regulate the deployment of the airbag 2, the airbag 2 protrudes upward from the seat cushion 101 at a position outside the lower body of the passenger P in the seat width direction, and contacts the regulating member from underneath. Therefore, the front portion 22 of the airbag 2 is turned inward in the seat width direction to deploy above the lower body of the passenger P. Thus, the airbag 2 protruding from the seat cushion 101 covers the upper part and the side part of the lower body of the passenger P, and therefore it is possible to protect the lower body of the passenger P from various types of collisions, such as a frontal collision, a lateral collision, a rear collision, and an oblique collision only by the components of the seat 100.

Moreover, when the airbag 2 protrudes from the seat cushion 101, it is preferred that the regulating member such as the tether 3 is disposed outside the lower body of the passenger P in the seat width direction, both when the regulating member is embedded in the seat 100 and when the regulating member is exposed on the seat 100. By this means, it is possible to prevent the regulating member from contacting the lower body of the passenger P. Therefore, it is possible to prevent the regulating member from harming the passenger P. Moreover, it is possible to prevent the regulating member from catching the lower body of the passenger P, and therefore to allow the regulating member to certainly contact the airbag 2 in a stable manner. As a result, it is possible to allow the front portion 22 of the airbag 2 to come close to a position above the lower body of the passenger above the lower body of the passenger P, and therefore it is possible to improve the passenger protection performance of the airbag 2 near the passenger P.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A passenger protection apparatus for a vehicle, the apparatus comprising:
    a regulating member configured to connect a first part of a side of a seat back included in an upper part of a seat of the vehicle to a second part of a side of a seat cushion included in a lower part of the seat; and
    an airbag disposed at a side of the seat between the first part and the second part, and configured to be deployed forward in the front-rear direction of the seat and outward in a seat width direction, wherein
    an outside part, in the seat width direction, of the deployed air bag is configured to contact an inside part, in the seat width direction, of the regulating member, and
    a front portion of the deployed air bag is configured to turn to a front of the seat inward in the seat width direction by tension of the regulating member.

2. The passenger protection apparatus for a vehicle according to claim 1, wherein the airbag is deployed via a surface of the seat or deployed from a periphery member of the seat.

3. The passenger protection apparatus for a vehicle according to claim 2, wherein:
    the airbag is deployed via the surface of the seat;
    the airbag protrudes from the seat back at a position outside an upper body of the passenger in the seat width direction, toward a front of the seat; and
    the airbag contacts the regulating member from behind to turn the front portion of the airbag inward in the seat width direction, and therefore deploys in front of the upper body of the passenger.

4. The passenger protection apparatus for a vehicle according to claim 3, further comprising an adjuster configured to adjust a length of the regulating member, wherein:
    the regulating member is embedded in the side of the seat before the deployment of the airbag; and as the airbag is deployed, the adjuster reduces the length of the regulating member to minimize a distance between the side of the seat back and the side of the lower part of the seat which are connected via the regulating member.

5. The passenger protection apparatus for a vehicle according to claim 2, wherein:
the airbag is deployed via the surface of the seat;
the airbag protrudes upward from the seat cushion at a position outside a lower body of the passenger in the seat width direction; and
the airbag contacts the regulating member from underneath to turn the front portion of the airbag inward in the seat width direction, and therefore deploys above the lower body of the passenger.

6. The passenger protection apparatus for a vehicle according to claim 5, further comprising an adjuster configured to adjust a length of the regulating member, wherein:
the regulating member is embedded in the side of the seat before the deployment of the airbag; and
as the airbag is deployed, the adjuster reduces the length of the regulating member to minimize a distance between the side of the seat back and the side of the lower part of the seat which are connected via the regulating member.

7. The passenger protection apparatus for a vehicle according to claim 2, further comprising an adjuster configured to adjust a length of the regulating member, wherein:
the regulating member is embedded in the side of the seat before the deployment of the airbag; and
as the airbag is deployed, the adjuster reduces the length of the regulating member to minimize a distance between the side of the seat back and the side of the lower part of the seat which are connected via the regulating member.

8. The passenger protection apparatus for a vehicle according to claim 2, wherein the regulating member is a tether or a planar member.

9. The passenger protection apparatus for a vehicle according to claim 1, further comprising an adjuster configured to adjust a length of the regulating member, wherein:
the regulating member is embedded in the side of the seat before the deployment of the airbag; and
as the airbag is deployed, the adjuster reduces the length of the regulating member to minimize a distance between the side of the seat back and the side of the lower part of the seat which are connected via the regulating member.

10. The passenger protection apparatus for a vehicle according to claim 1, wherein the regulating member is a tether or a planar member.

11. The passenger protection apparatus for a vehicle according to claim 1, wherein the regulating member contacts an area between an outer end and a center of the airbag in the seat width direction.

12. The passenger protection apparatus for a vehicle according to claim 1 further comprising a detector and a controller, wherein the detector is configured to detect for different types of anticipated collisions, inclusive of a frontal impact collision and a side impact collision, and wherein the controller is configured to adjust the time and force in which the regulating member contacts the airbag based on which of the anticipated collisions the detector detects.

13. The passenger protection apparatus for a vehicle according to claim 1, further comprising:
a controller that is configured to increase tension on the regulating member to a predetermined value to push the airbag inward in the seat width direction, when the controller detects that the airbag is filled with a predetermined amount of gas.

14. A passenger protection apparatus for a vehicle, the apparatus comprising:
an airbag capable of deploying forward or upward from a side of a seat on which a passenger sits;
a regulating member capable of regulating deployment of the airbag, the regulating member connecting a side of a seat back of the seat and a side of a lower part of the seat, and the regulating member being configured to contact an outside of the airbag in a seat width direction to regulate a deployment direction of the airbag to deploy the airbag inward in the seat width direction, and wherein the regulating member contacts an area between an outer end and a center of the airbag in the seat width direction.

15. The passenger protection apparatus for a vehicle according to claim 14, further comprising:
an adjuster configured to adjust a length of the regulating member, wherein:
the regulating member is embedded in the side of the seat before the deployment of the airbag; and, as the airbag is deployed, the adjuster reduces the length of the regulating member to minimize a regulating member distance of extension between the side of the seat back and the side of the lower part of the seat which are connected via the regulating member; and wherein the adjuster is configured as to reduce the length at a greater rate under an anticipated frontal impact as compared to a lower rate of length reduction under an anticipated side impact.

16. The passenger protection apparatus for a vehicle according to claim 15 further comprising a detector and a controller, wherein the detector is configured to detect for different types of anticipated collisions, inclusive of a frontal impact collision and a side impact collision, and wherein the controller is configured to signal the adjuster as to which different rate of length reduction to implement based on the detected anticipated collision type.

17. The passenger protection apparatus for a vehicle according to claim 16, wherein the controller is configured to increase tension on the regulating member to a predetermined value to push the airbag inward in the seat width direction, when the controller detects that the airbag is filled with a predetermined amount of gas.

18. The passenger protection apparatus for a vehicle according to claim 14, further comprising:
a controller that is configured to increase tension on the regulating member to a predetermined value to push the airbag inward in the seat width direction, when the controller detects that the airbag is filled with a predetermined amount of gas.

19. A passenger protection apparatus for a vehicle, the apparatus comprising:
a tether configured to connect a first part of a side of a seat back included in an upper part of a seat of the vehicle to a reel disposed in a second part of a side of a seat cushion included in a lower part of the seat, the reel being configured for reel up of the tether; and
an airbag disposed in a side of the seat between the first part and the second part, and configured to be deployed forward in the front-rear direction of the seat and outward in a seat width direction, wherein
an outside part, in a seat width direction, of the deployed air bag is configured to contact an inside part, in the seat width direction, of the tether, and a front portion of the deployed airbag is configured to turn to a front of the seat inward in the seat width direction by tension of the tether.

20. The passenger protection apparatus for a vehicle according to claim 19, further comprising:
a controller configured to increase, by reel-up of the reel, tension on the tether to a predetermined value to push the airbag inward in the seat width direction, when the controller detects that the airbag is filled with a predetermined amount of gas.

* * * * *